(12) United States Patent
Ouyang et al.

(10) Patent No.: US 9,885,939 B2
(45) Date of Patent: Feb. 6, 2018

(54) TE OPTICAL SWITCH BASED ON SLAB PHOTONIC CRYSTALS WITH HIGH DEGREE OF POLARIZATION AND LARGE EXTINCTION RATIO

(71) Applicant: Zhengbiao Ouyang, Shenzhen, Guangdong Province (CN)

(72) Inventors: Zhengbiao Ouyang, Shenzhen (CN); Guohua Wen, Shenzhen (CN)

(73) Assignee: Zhengbiao Ouyang, Shenzhen, Guangdong Province (CN)

( * ) Notice: Subject to any disclaimer, the term of this patent is extended or adjusted under 35 U.S.C. 154(b) by 0 days.

(21) Appl. No.: 15/620,809

(22) Filed: Jun. 12, 2017

(65) Prior Publication Data

US 2017/0277014 A1    Sep. 28, 2017

Related U.S. Application Data

(63) Continuation of application No. PCT/CN2015/097052, filed on Dec. 10, 2015.

(30) Foreign Application Priority Data

Dec. 10, 2014  (CN) .......................... 2014 1 0759473

(51) Int. Cl.
  *G02F 1/295*  (2006.01)
  *G02F 1/313*  (2006.01)
(52) U.S. Cl.
  CPC ........ *G02F 1/3133* (2013.01); *G02F 2201/06* (2013.01); *G02F 2202/32* (2013.01); *G02F 2203/07* (2013.01)

(58) Field of Classification Search
  CPC ......... B82Y 20/00; G02F 1/225; G02F 1/295; G02F 1/3133; G02B 6/12007; G02B 6/1225

See application file for complete search history.

(56) References Cited

U.S. PATENT DOCUMENTS 7,428,348 B2 *  9/2008  Prather .................. B82Y 20/00
                                                                    385/129
7,529,437 B2 *  5/2009  Spillane ................ B82Y 10/00
                                                                    385/14

FOREIGN PATENT DOCUMENTS

CN     101308246 A    11/2008
CN     101866089 A    10/2010
(Continued)

*Primary Examiner* — Jennifer Doan
(74) *Attorney, Agent, or Firm* — Cheng-Ju Chiang

(57) ABSTRACT

The present invention discloses a TEOS based on slab PhCs with a high DOP and large EXR, which comprises an upper slab PhC and a lower slab PhC; the upper slab PhC is a first square-lattice slab PhC with a TM bandgap and a complete bandgap, wherein the unit cell of the first square-lattice slab PhC includes a high-refractive-index rotating-square pillar, a single first flat dielectric pillar and a background dielectric, the first flat dielectric pillar includes a high-refractive-index dielectric pipe and a low-refractive-index dielectric, or a high-refractive-index flat film, or a low-refractive-index dielectric; the lower slab PhC is a second square lattice slab PhC with a TM bandgap and complete bandgap, wherein the unit cell of the second square-lattice slab PhC includes a high-refractive-index rotating-square pillar, a single second flat dielectric pillar and a background dielectric, and an normalized operating frequency of the TEOS is 0.453 to 0.458.

12 Claims, 13 Drawing Sheets

(56) References Cited

FOREIGN PATENT DOCUMENTS

| | | | |
|---|---|---|---|
| CN | 102213793 | A | 10/2011 |
| CN | 104101946 | A | 10/2014 |
| CN | 104101949 | A | 10/2014 |
| CN | 104297842 | A | 1/2015 |
| CN | 104459988 | A | 3/2015 |
| CN | 104459990 | A | 3/2015 |
| CN | 104459991 | A | 3/2015 |
| JP | 2005-77710 | A | 3/2005 |
| WO | 2016/050185 | A1 | 4/2016 |
| WO | 2016/091192 | A1 | 6/2016 |
| WO | 2016/091193 | A1 | 6/2016 |
| WO | 2016/091194 | A1 | 6/2016 |

\* cited by examiner

TE OPTICAL SWITCH BASED ON SLAB PHOTONIC CRYSTALS WITH HIGH DEGREE OF POLARIZATION AND LARGE EXTINCTION RATIO

This application claims priority to Chinese Application No. 201410759473.X filed on Dec. 10, 2014 and International Application No. PCT/CN2015/097052 filed on Dec. 10, 2015 and published in Chinese as International Publication No. WO/2016/091193 on Jun. 16, 2016, the entire contents of which are hereby incorporated by reference.

FIELD OF THE INVENTION

The present invention relates generally to a TE optical switch (TEOS) with a high DOP and a large EXR, and specifically to a TEOS based on absolute photonic bandgaps (PBGs) slab photonic crystals (PhCs) with a high degree of polarization (DOP) and a large extinction ratio (EXR).

BACKGROUND OF THE INVENTION

In recent years, with the advent of information age, the speed and amount of information required for communication technology increase dramatically. Optical communication technologies add wings to the information age, but the information processing of nodes and routes still need electronic circuits at present, which restricts the development of communication technologies in terms of speed, capacity and power consumption. Adopting photonic integrated circuits to replace or partially replace electronic integrated circuits for communication routes certainly will become the future direction of development.

A PhC is a structure material in which dielectric materials are arranged periodically in space, and is usually an artificial crystal consisting of two or more materials having different dielectric constants.

The electromagnetic modes in an absolute PBG cannot exist completely, so as an electronic energy band is overlapped with the absolute PBG of PhC, spontaneous radiation is suppressed. The PhC having the absolute PBG can control spontaneous radiation, thereby changing the interaction between the field and materials and further improving the performance of optical devices.

Tunable PBGs can be applied to information communication, display and storage. For modulating at high speeds by using external driving sources, many solutions have been proposed, e.g., controlling magnetic permeability by using a ferromagnetic material, and changing dielectric constant by using a ferroelectric material.

Most of the existing optical switches are realized by using a nonlinear effect, which requires the use of high-power light for control, thus it will inevitably consume a large amount of energy. In the presence of large-scale integrated system and a large number of communication users, the consumption of energy will become enormous. At the same time, the DOP will affect signal-to-noise ratio and transmission speed.

SUMMARY OF THE INVENTION

The present invention is aimed at overcoming the defects of the prior art and providing a TEOS facilitating slab PhCs with a high DOP and a large EXR integration.

The aim of the present invention is realized by the following technical solution.

A TEOS with a high DOP and a large EXR based on slab PhCs in the present invention comprises an upper slab PhC and a lower slab PhC connected as a whole; the upper slab PhC is a first square-lattice slab PhC with a TM bandgap and a complete bandgap, the unit cell of the first square-lattice slab PhC includes a high-refractive-index rotating-square pillar, a single first flat dielectric pillar and a background dielectric, the first flat dielectric pillar is arranged horizontally, said first flat dielectric pillar enables an overall upper slab PhC to form as a whole, and the first flat dielectric pillar includes a high-refractive-index dielectric pipe and a low-refractive-index dielectric, or a high-refractive-index flat film, or a low-refractive-index dielectric; the lower slab PhC is a second square-lattice slab PhC with a TM bandgap and a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables an overall lower slab PhC to form as a whole, the second flat dielectric pillar is a high-refractive-index dielectric pillar, the background dielectric is a low-refractive-index dielectric; an normalized operating frequency of the TEOS with a high DOP and a large EXR is 0.453 to 0.458, 0.503 to 0.509 or 0.553 to 0.574, referred to as operating band.

The thickness of the pipe wall in said first flat dielectric pillar in the unit cell of the first square-lattice slab PhC is 0-0.004a, where a is the lattice constant of the PhC; and a width of the low-refractive-index dielectric in the pipe is the difference between a width of said first flat dielectric pillar and the thickness of the pipe.

The side lengths of said high-refractive-index rotating-square pillars of the first and second square-lattice slab PhCs are respectively 0.545a to 0.554a, and their rotating angles are 23.25° to 26.45° and 66.75° to 68.95°; and the widths of the first and second flat dielectric pillars of the first and second square-lattice slab PhCs are respectively 0.075a to 0.082a.

The first and second flat dielectric pillars of the first and second square-lattice slab PhCs are respectively spaced 0.2a from the same side of the centers of the rotating-square pillars.

The high-refractive-index dielectric is silicon, gallium arsenide, titanium dioxide or a different dielectric having a refractive index of more than 2.

The low-refractive-index dielectric is vacuum, air, cryolite, silica, organic foam, olive oil or a different dielectric having a refractive index of less than 1.5.

The TEOS has one state that said first square-lattice slab PhC is located in an optical channel (OCH) and the second square-lattice slab PhC is located outside the OCH, and another state that said second square-lattice slab PhC is located in the OCH and the first square-lattice slab PhC is located outside the OCH.

Within the frequency range of 0.453 to 0.458, the state that said second square-lattice slab PhC is located in the OCH and the first square-lattice slab PhC is located outside the OCH is an optically connected state; the state that the first square-lattice slab PhC is located in the OCH and the second square-lattice slab PhC is located outside the OCH is an optically disconnected state; the normalized operating frequency of the TEOS is 0.453 to 0.458, the TE polarization EXR is −22 dB to −23 dB, the highest DOP reaches 100%, a TM wave within an operating band is prevented, and an isolation degree (ISD) is −50 dB to −68 dB.

The normalized operating frequency of the TEOS is 0.503 to 0.509 or 0.553 to 0.574, the state that said first square-lattice slab PhC is located in the OCH and the second square-lattice slab PhC is located outside the OCH is the optically connected state; the state that the second square-lattice slab PhC is located in the OCH and the first square-lattice slab PhC is located outside the OCH is the optically disconnected state; the normalized operating frequency of the TEOS is 0.503 to 0.509, the TE polarization EXR is −16 dB to −28 dB, the highest DOP reaches 100%, the TM wave within the operating band is prevented, and the ISD is −16 dB to −53 dB; the normalized operating frequency of the TEOS is 0.553 to 0.574, said TE polarization EXR is −16 dB to −41 dB, the DOP is 100%, the TM wave within the operating band is prevented, and the ISD is −21 dB to −62 dB.

Positions of said first square-lattice slab PhC and the second square-lattice slab PhC in the OCH are adjusted by external forces, including mechanical, electrical and magnetic forces.

Within the frequency range of 0.453 to 0.458, the state that the second slab square-lattice PhC is located in the OCH and the first square-lattice slab PhC is located outside the OCH is the OCH connected state; the state that said first square-lattice slab PhC is located in the OCH and said second square-lattice slab PhC is located outside the OCH is the optically disconnected state; the normalized operating frequency of said TEOS is 0.453 to 0.458, said TE polarization EXR is −22 dB to −23 dB, the highest DOP reaches 100%, the TM wave within the operating band is prevented, and the ISD is −50 dB to −68 dB.

The normalized operating frequency of the TEOS is 0.503 to 0.509 or 0.553 to 0.574, the state that the first square-lattice slab PhC is located in the OCH and the second square-lattice slab PhC is located outside the OCH is the optically connected state; the state that the second square-lattice slab PhC is located in the OCH and the first square-lattice slab PhC is located outside the OCH is an optically disconnected state; the normalized operating frequency (a/λ) of the TEOS is 0.503 to 0.509, said TE polarization EXR is −16 dB to −28 dB, the highest DOP reaches 100%, the TM wave within the operating band is prevented, and the ISD is −16 dB to −53 dB; the normalized operating frequency of the TEOS is 0.553 to 0.574, the TE polarization EXR is −16 dB to −41 dB, the DOP is 100%, the TM wave within the operating band is prevented, and the ISD is −21 dB to −62 dB.

Compared with the prior art, the present invention has the following positive effects.

1. The optical switch is an indispensable component in an integrated OCH and is very important for high-speed operation of a network, and large bandwidth, low energy loss, high DOP and high EXR are important parameters for evaluating switches.

2. The functions of the optical switch are realized by adjusting the positions of the first square-lattice slab PhC (the upper slab PhC) and the second square-lattice slab PhC (the lower slab PhC) in the OCH.

3. The structure of the present invention enables a TEOS with a high DOP and a large EXR.

4. The TEOS with facilitates slab PhCs with a high DOP and a large EXR integration.

These and other objects and advantages of the present invention will become readily apparent to those skilled in the art upon reading the following detailed description and claims and by referring to the accompanying drawings.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

The present invention will be further described in detail below in combination with the accompanying drawings and specific embodiments.

Figure 1A:
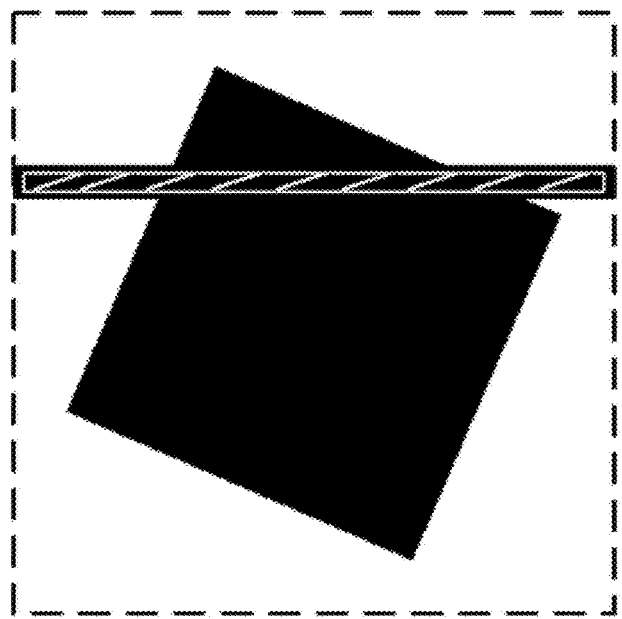
FIG. 1(a) is a structural schematic diagram of the unit cell of an upper slab PhC of a TEOS of the present invention.
Figure 1B:
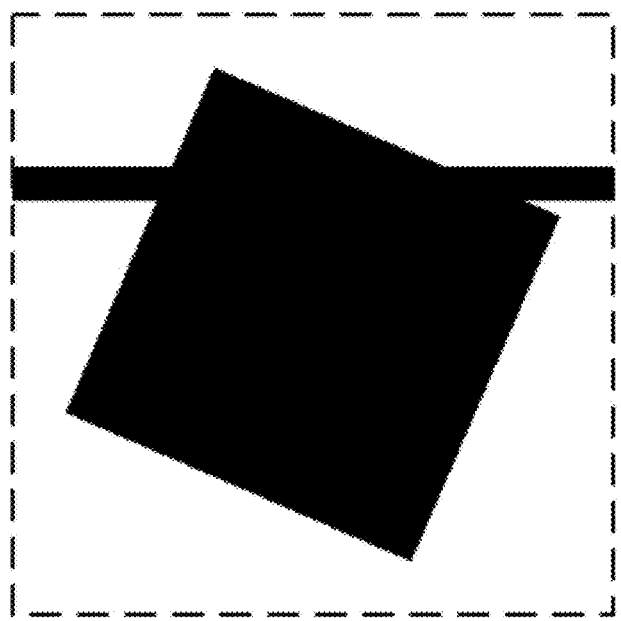
FIG. 1(b) is a structural schematic diagram of the unit cell of a lower slab PhC of the TEOS of the present invention.

A TEOS based on slab PhCs with a high DOP and a large EXR in the present invention, as shown in FIG. 1(a), comprises an upper slab PhC and a lower slab PhC connected as a whole; the upper slab PhC is a first square-lattice slab PhC with a TM bandgap and a complete bandgap, the unit cell of the first square-lattice slab PhC includes a high-refractive-index rotating-square pillar, a single first flat dielectric pillar and a background dielectric, the first flat dielectric pillar dielectric is arranged horizontally, the first flat dielectric pillar enables the overall upper slab PhC to form as a whole, and the first flat dielectric pillar includes a high-refractive-index dielectric pipe and a low-refractive-index dielectric in the pipe, or a high-refractive-index flat film, or a low-refractive-index dielectric; as shown in FIG. 1(b), the lower slab PhC is a second square-lattice slab PhC with a TM bandgap and a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables the overall lower slab PhC to form as a whole, the second flat dielectric pillar is a high-refractive-index dielectric pillar, and the high-refractive-index dielectric is silicon, gallium arsenide, titanium dioxide or a different dielectric having a refractive index of more than 2; the background dielectric is a low-refractive-index dielectric, and the low-refractive-index dielectric is vacuum, air, cryolite, silica, organic foam, olive oil or a different dielectric having a refractive index of less than 1.5. The normalized operating frequency (a/λ) of the TEOS with a high DOP and a large EXR is 0.453 to 0.458, 0.503 to 0.509 or 0.553 to 0.574, and this operating band is either the TM bandgap and TE transmission band of the upper slab PhC and the complete bandgap of the lower slab PhC, or the complete bandgap of the upper slab PhC and the TM bandgap and TE transmission band of the lower slab PhC, wherein a is a lattice constant of the first and second slab PhCs, and λ is the wavelength of incident wave.

A TEOS based on slab PhCs with a high DOP and a large EXR is realized by adjusting the positions of the first and second slab square-lattice slab PhCs in an OCH; the state that the first square-lattice slab PhCs is located in the OCH and the second square-lattice slab PhC is located outside the OCH is a first switch state of the TEOS with a high DOP and a large EXR; and the state that the second square-lattice slab PhC is located in the OCH and the first square-lattice slab PhC is located outside the OCH is a second switch state of the TEOS with a high DOP and a large EXR.

As the operating frequency (a/λ) range of the TEOS with a high DOP and a large EXR is 0.453 to 0.458, the state that the second slab square-lattice PhC is located in the OCH and the first square-lattice slab PhC is located outside the OCH is an optically connected state; the state that the first square-lattice slab PhC is located in the OCH and the second square-lattice slab PhC is located outside the OCH is an optically disconnected state; in the case that the normalized operating frequency (a/λ) of the TEOS is 0.453 to 0.458, the TE polarization EXR is −22 dB to −23 dB, the highest DOP reaches 100%, the TM wave within the operating band is prevented, and the ISD is −50 dB to −68 dB, wherein a is a lattice constant of the first and second square-lattice slab PhCs, and λ is the wavelength of incident wave.

In the case that the frequency (a/λ) range of the TEOS is 0.503 to 0.509 or 0.553 to 0.574, the state that the first square-lattice slab PhC is located in the OCH and the second square-lattice slab PhC is located outside the OCH is an optically connected state; the state that the second square-lattice slab PhC is located in the OCH and the first square-lattice slab PhC is located outside the OCH is an optically disconnected state; in the case that the normalized operating frequency (a/λ) of the TEOS is 0.503 to 0.509, the TE polarization EXR is −16 dB to −28 dB, the highest DOP reaches 100%, the TM wave within the operating band is prevented, and the ISD is −16 dB to −53 dB; as the normalized operating frequency (a/λ) of the TEOS is 0.553 to 0.574, the TE polarization EXR is −16 dB to −41 dB, the highest DOP reaches 100%, the TM wave within the operating band is prevented, and the ISD is −21 dB to −62 dB.

The EXR of the TEOS is a ratio of the output optical powers of the TEOS in the two states, and the DOP of the TEOS refers to a ratio of optical power difference to optical power sum of the TE wave and the TM wave at the output end in the switch ON state.

The first implementation of the TEOS based on slab PhCs with a high DOP and a large EXR.

Figure 2A:
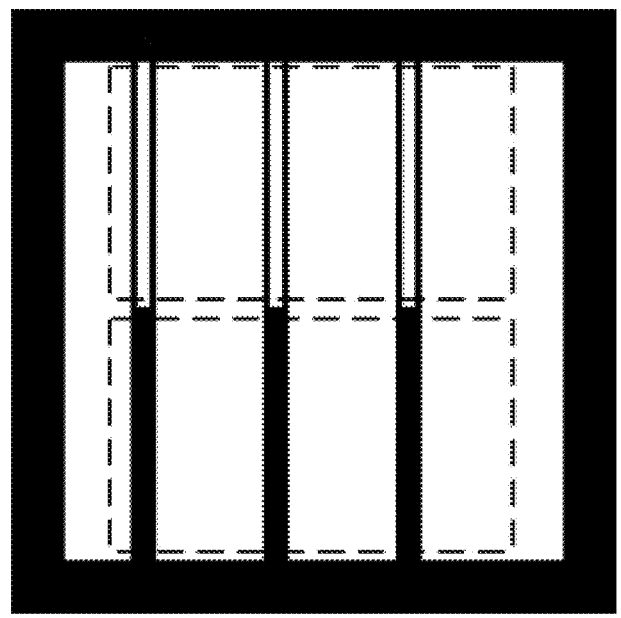
FIG. 2(a) is a structural schematic diagram of a first implementation of the TEOS based on slab PhCs with a high DOP and a large EXR as shown in FIGS. 1(a) and 1(b).
Figure 2:
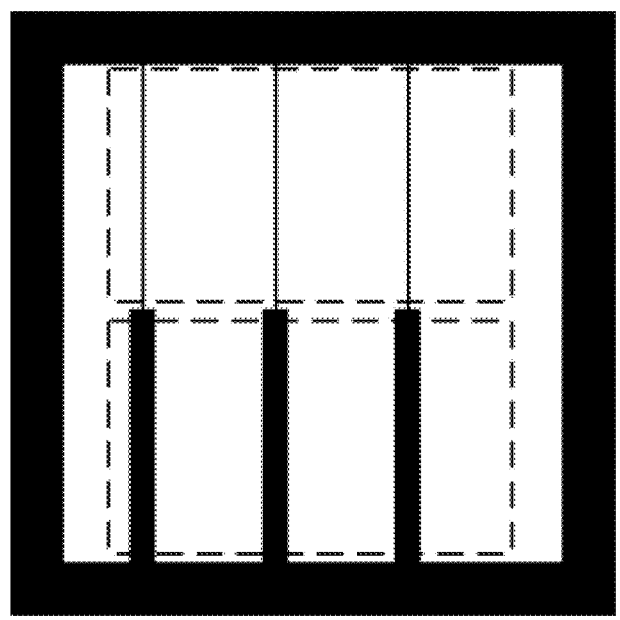
FIG. 2(b) is a structural schematic diagram of a second implementation of the TEOS based on slab PhCs with a high DOP and a large EXR as shown in FIGS. 1(a) and1 (b).
FIG. 2(c) is a structural schematic diagram of a third implementation of the TEOS based on slab PhCs with a high DOP and a large EXR as shown in FIGS. 1(a) and 1(b).
Figure 2:
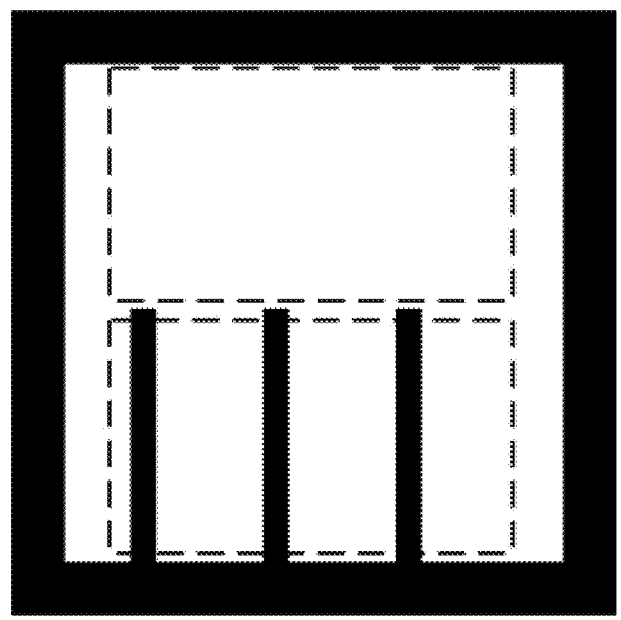

The TEOS includes an upper slab PhC and a lower slab PhC connected as a whole; as shown in FIG. 2(a), rotating-square pillars in PhC are omitted in the figure, and the dashed box shows the position of a rotating-square pillar array; the upper slab PhC is a first square-lattice slab PhC with a TM bandgap and a complete bandgap, the unit cell of the first square-lattice slab PhC includes a high-refractive-index rotating-square pillar, a single first flat dielectric pillar and a background dielectric, the first dielectric is arranged horizontally, the first flat dielectric pillar enables the overall upper slab PhC to form as a whole, the first flat dielectric pillar includes a high-refractive-index pipe and a low-refractive-index dielectric in the pipe, the thickness of the pipe wall in the first dielectric rod in the unit cell of the first square-lattice slab PhC is 0 to 0.004a; and the width of the low-refractive-index dielectric in the pipe is the difference between the width of the first flat dielectric pillar and the thickness of the pipe. The lower slab PhC is a second square-lattice slab PhC with a TM bandgap and a complete bandgap, the unit cell of the second square-lattice slab PhC includes a high-refractive-index rotating-square pillar, a single second flat dielectric pillar and a background dielectric, the second dielectric is arranged horizontally, the second dielectric enables the overall lower slab PhC to form as a whole, and the first flat dielectric pillar and the second flat dielectric pillar of the first and second square-lattice slab PhCs are respectively spaced 0.2a from the centers of the rotating-square pillars. The side lengths of the high-refractive-index rotating-square pillars of the first and second square-lattice slab PhCs are respectively 0.545a to 0.554a, their rotating angles are 16.01° to 35.04° and 55° to 66.83°, and the widths of the first and second flat dielectric pillars of the first and second square-lattice slab PhCs are respectively 0.075a to 0.082a; the second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, olive oil or a different dielectric having a refractive index of less than 1.5. The normalized operating frequency (a/λ) of the TEOS with a high DOP and a large EXR is 0.453 to 0.458, 0.503 to 0.509 or 0.553 to 0.574, and this frequency band is either the TM bandgap and TE transmission band of the upper slab PhC and the complete bandgap of the lower slab PhC, or the complete bandgap of the upper slab PhC and the TM bandgap and TE transmission band of the lower slab PhC, wherein a is a lattice constant of the first and second square-lattice slab PhCs, and λ is the wavelength of incident wave.

The second implementation of the TEOS based on slab PhCs with a high DOP and a large EXR.

The TEOS includes an upper slab PhC and a lower slab PhC connected as a whole; as shown in FIG. 2(b), rotating-square pillars in PhC are omitted in the figure, and the dashed box shows the position of a rotating-square pillar array; the upper slab PhC is a first square-lattice slab PhC with a TM bandgap and a complete bandgap, the unit cell of the first square-lattice slab PhC includes a high-refractive-index rotating-square pillar, a single first flat dielectric pillar and a background dielectric, the first flat dielectric pillar is arranged horizontally, the first flat dielectric pillar enables the overall upper slab PhC to form as a whole, and the first flat dielectric pillar includes a high-refractive-index flat film; the lower slab PhC is a second square-lattice slab PhC with a TM bandgap and a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables the overall lower slab PhC to form as a whole, the first flat dielectric pillar and the second flat dielectric pillar of the first and second square-lattice slab PhCs are respectively spaced 0.2a from the centers of the rotating-square pillars, the side lengths of the high-refractive-index rotating-square pillars of the first and second square-lattice slab PhCs are respectively 0.545a to 0.554a, their rotating angles are 23.25° to 26.45° and 66.75° to 68.95°, and the widths of the first and second flat dielectric pillars of the first and second square-lattice slab PhCs are respectively 0.075a to 0.082a. The second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, olive oil or a different dielectric having a refractive index of less than 1.5. The normalized operating frequency (a/λ) of the TEOS with a high DOP and a large EXR is 0.453 to 0.458, 0.503 to 0.509 or 0.553 to 0.574, and this frequency band is either the TM bandgap and TE transmission band of the upper slab PhC and the complete bandgap of the lower slab PhC, or the complete bandgap of the upper slab PhC and the TM bandgap and TE transmission band of the lower slab PhC, wherein a is a lattice constant of the first and second square slab lattice PhCs, and λ is the wavelength of incident wave.

The three implementations of the TEOS based on slab PhCs with a high DOP and a large EXR.

The TEOS includes an upper slab PhC and a lower slab PhC connected as a whole; as shown in FIG. 2(C), rotating-square pillars in PhC are omitted in the figure, and the dashed box shows the position of a rotating-square pillar array. The upper slab PhC is a first square-lattice slab PhC with a TM bandgap and a complete bandgap, the unit cell of the first square-lattice slab PhC includes a high-refractive-index rotating-square pillar, a single first flat dielectric pillar and a background dielectric, the first dielectric flat dielectric pillar includes a low-refractive-index dielectric, the background dielectric is a low-refractive-index dielectric, a slot is formed in the high-refractive-index rotating-square pillar and is filled with the low-refractive-index dielectric, and the low-refractive-index dielectric is vacuum, air, cryolite, silica, organic foam, olive oil or a different dielectric having a refractive index of less than 1.5, e.g., the slot is filled with air. The lower slab PhC is a second square-lattice slab PhC with a TM bandgap and a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables the overall lower slab PhC to form as a whole, the first flat dielectric pillar and the second flat dielectric pillar of the first and second square-lattice slab PhCs are respectively spaced 0.2a from the centers of the rotating-square pillars, the side lengths of the high-refractive-index rotating-square pillars of the first and second square-lattice slab PhCs are respectively 0.45a to 0.554a, and their rotating angles are 16.01° to 35.04° and 55° to 66.83°; the widths of the first and second flat dielectric pillars of the first and second square-lattice slab PhCs are respectively 0.075a to 0.082a; the second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric; the normalized operating frequency (a/λ) of the TEOS with a high DOP and a larger EXR is 0.453 to 0.458, 0.503 to 0.509 or 0.553 to 0.574, and this frequency band is either the TM bandgap and TE transmission band of the upper slab PhC and the complete bandgap of the lower slab PhC, or the complete bandgap of the upper slab PhC and the TM bandgap and TE transmission band of the lower slab PhC, wherein a is a lattice constant of the first and second square-lattice slab PhCs, and λ is the wavelength of incident wave.

The afore said three implementations all take a paper surface as the reference plane, and the upper and lower slab PhCs are connected as a whole by a frame and move vertically under the action of external forces to realize the functions of the TEOS, as shown in FIGS. 2(a), 2(b) and 2(c). Rotating-square pillars in PhC are omitted in the figure, and the dashed box shows the position of a rotating-square pillar array. Because the frame itself is not on the light input and output planes, i.e., the light input and output planes are parallel to the reference plane, the propagation of light is not influenced. The vertical movement of the upper and lower slab PhCs serving as a whole can be realized by micromechanical, electrical or magnetic forces. For example, a magnet may be embedded into the frame, a pressure linkage device is connected with the frame, the pressure can thus drive the black frame to move up and down, and the left and right sides of the frame are located in a groove guide rail to guarantee that the black frame moves vertically, linearly and reciprocally.

EMBODIMENT 1

Figure 3:
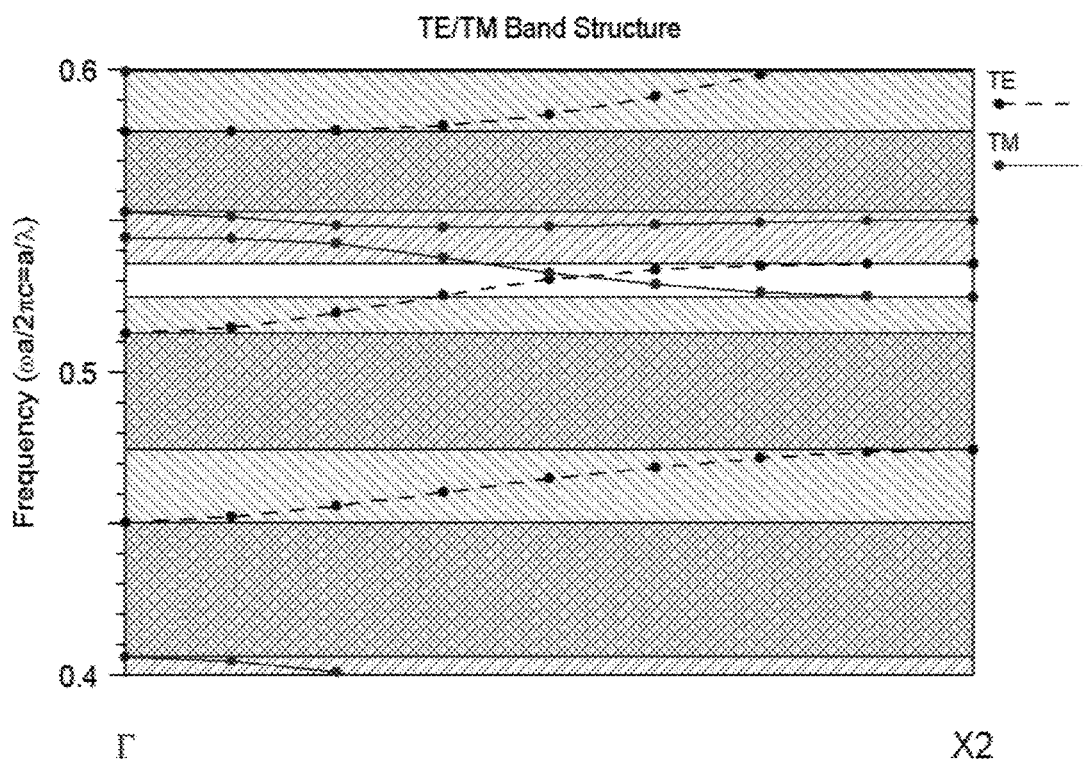
FIG. 3 is a photonic band map structure of the second square-lattice slab PhC shown in embodiment 1.
Figure 4:
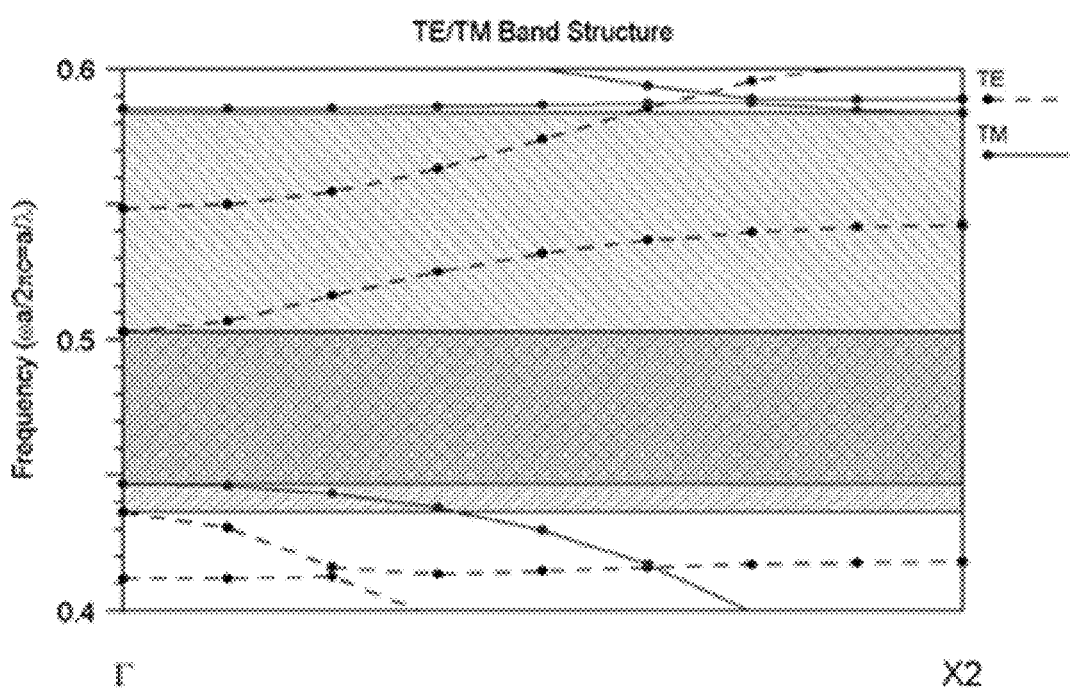
FIG. 4 is a photonic band map structure of the first square-lattice slab PhC shown in embodiment 1.

In this embodiment, different structural diagrams of photonic bands in a vertical direction are obtained through the first and second square-lattice slab PhCs, FIG. 3 is a photonic band map structure of the second square-lattice slab PhC, FIG. 4 is a photonic band map structure of the first square-lattice slab PhC, and it can be known by comparison that in the case that the normalized operating frequency (a/λ) ranges are 0.4506 to 0.4745 and 0.5531 to 0.5795, this structure enables a TEOS with a high DOP and a large EXR, thereby realizing the functions of the TEOS with a high EXR.

EMBODIMENT 2

Figure 5:
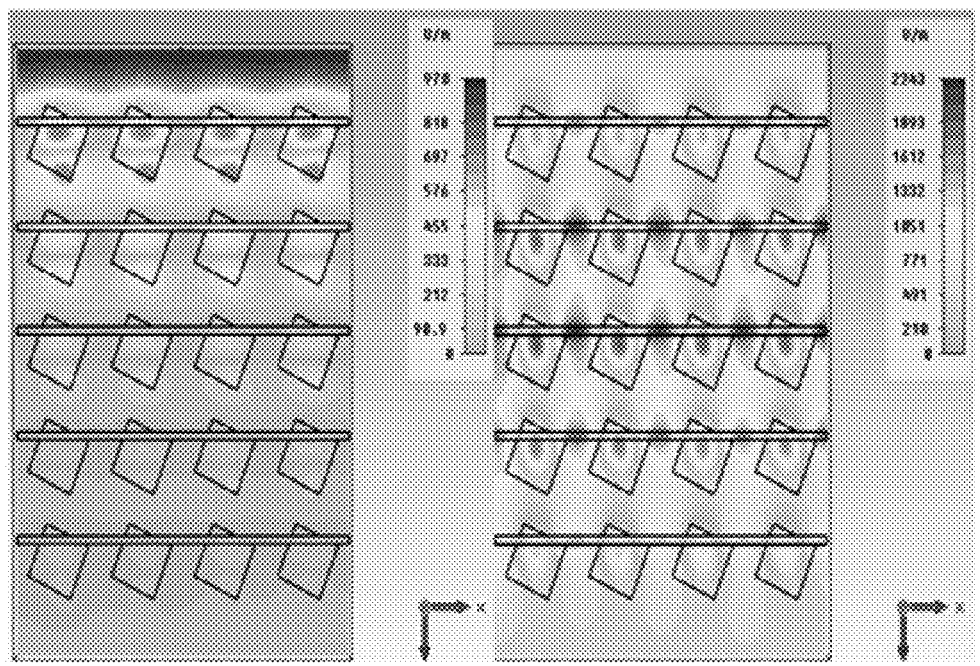
FIG. 5(a) is a TE field distribution diagram in the TEOS for the normalized operating frequency of 0.453 as shown in embodiment 2.
FIG. 5(b) is a TM field distribution diagram in the TEOS for the normalized operating frequency of 0.453 as shown in embodiment 2.
Figure 5:
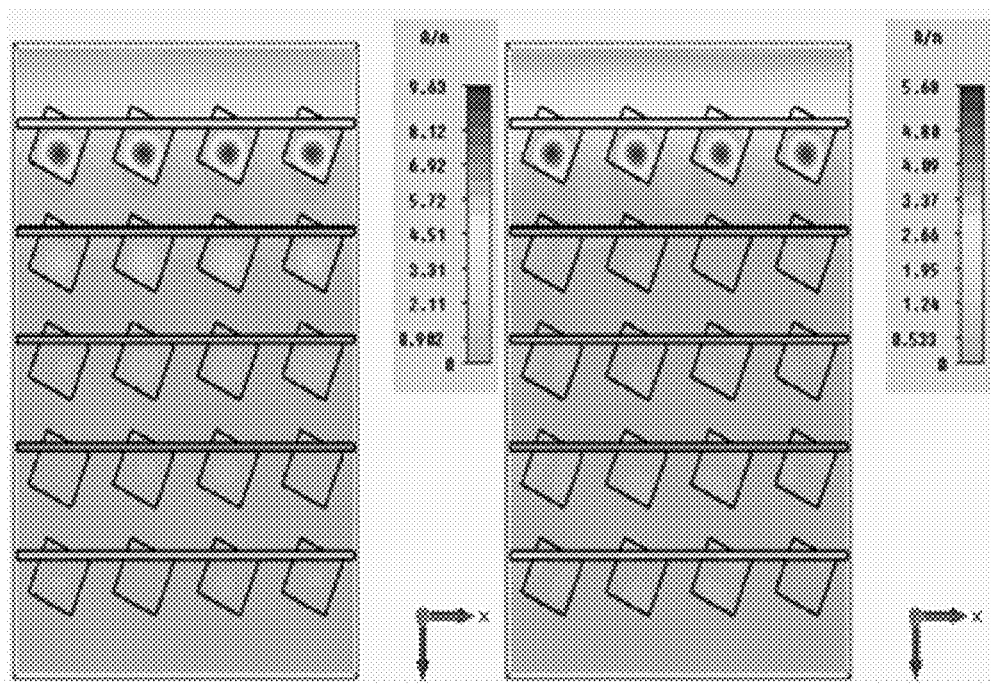

In this embodiment, the normalized photonic operating frequency (a/λ) is 0.453. By adopting the first implementation and verifying with three-dimensional (3D) structure parameters for five layers of high-refractive-index rotating dielectric pillars and five layers of high-refractive-index dielectric veins consisting of rotating pillars and connecting plates, the result is illustrated in FIGS. 5(a) and 5(b). It can be known from FIGS. 5(a) and 5(b) that: the TEOS has a high DOP and good extinction effect.

EMBODIMENT 3

Figure 6A:
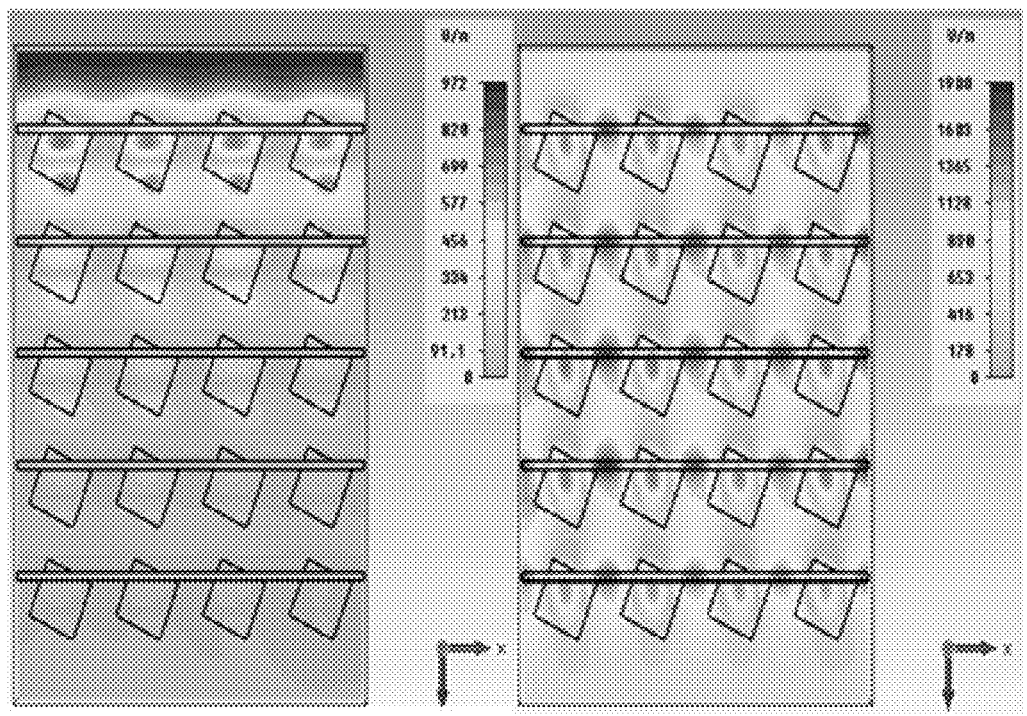
FIG. 6(a) is a TE field distribution diagram in the TEOS for the normalized operating frequency of 0.4567 as shown in embodiment 3.
Figure 6:
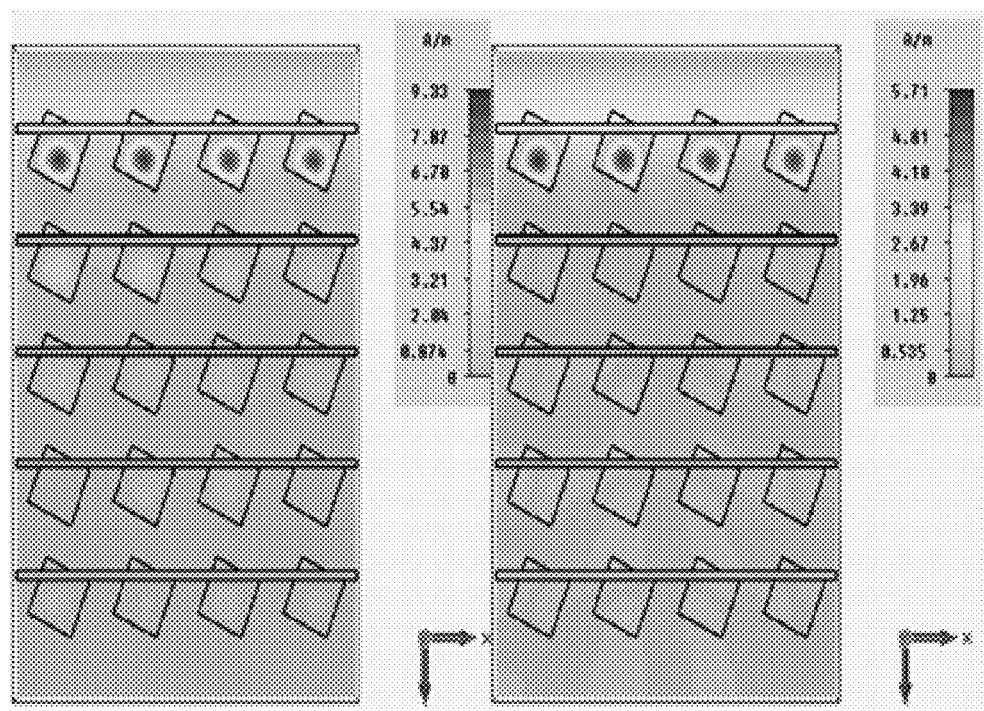
FIG. 6(b) is a TM field distribution diagram in the TEOS for the normalized operating frequency of 0.4567 as shown in embodiment 3.

In this embodiment, the normalized photonic operating frequency (a/λ) is 0.4567. By adopting the first implementation and verifying with 3D structure parameters for five layers of high-refractive-index rotating dielectric rods and five layers of high-refractive-index dielectric veins consisting of rotating rods and connecting plates, the result is illustrated in FIGS. 6(a) and 6(b). It can be known from FIGS. 6(a) and 6(b) that: the TEOS has a high DOP and good extinction effect.

EMBODIMENT 4

Figure 7:
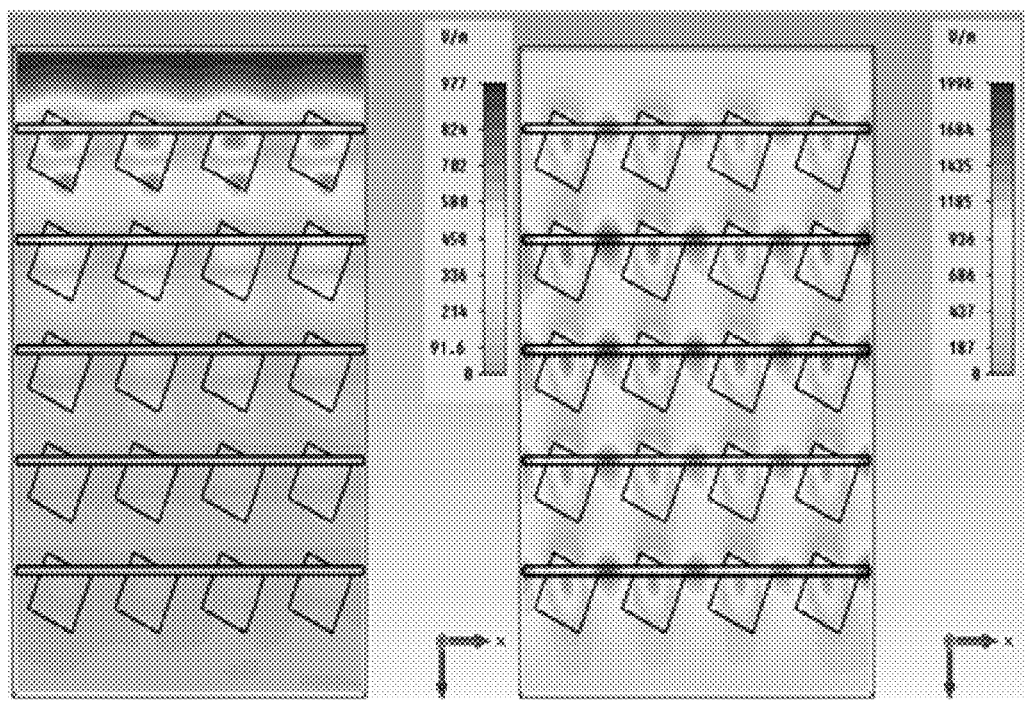
FIG. 7(a) is a TE field distribution diagram of the TEOS for the normalized operating frequency of 0.458 as shown in embodiment 4.
FIG. 7(b) is a TM field distribution diagram of the TEOS for the normalized operating frequency of 0.458 as shown in embodiment 4.
Figure 7B:
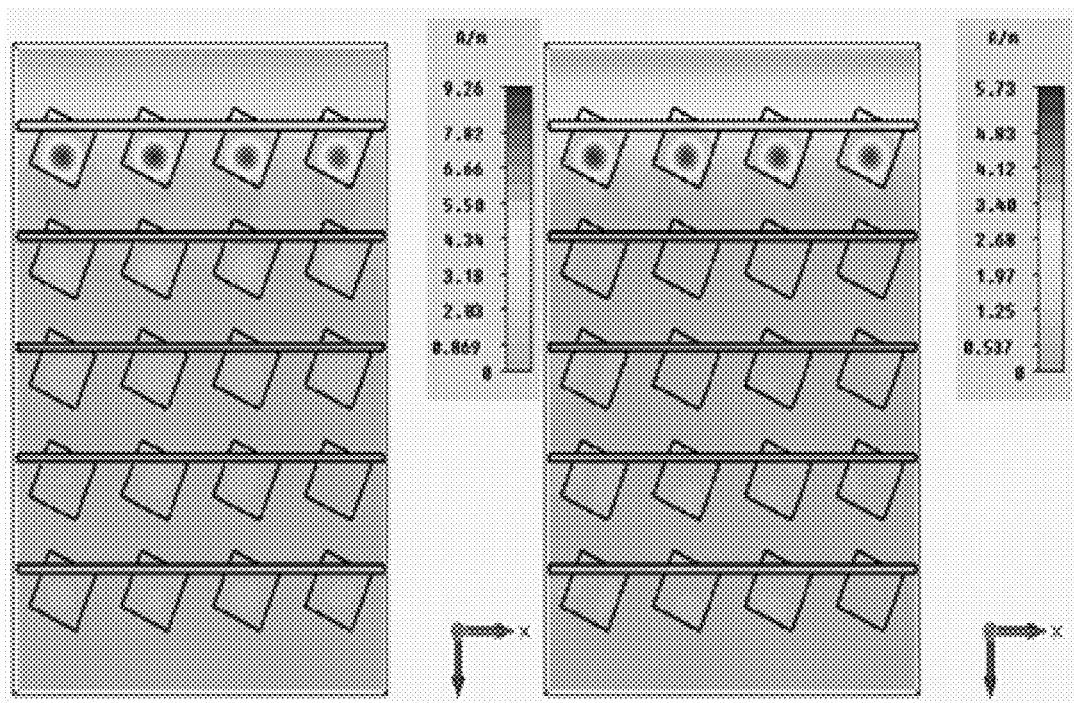

In this embodiment, the normalized photonic operating frequency (a/λ) is 0.458. By adopting the second implementation and verifying with 3D structure parameters for five layers of high-refractive-index rotating dielectric pillars and five layers of high-refractive-index dielectric veins consisting of rotating pillars and connecting plates, the result is illustrated in FIGS. 7(a) and 7(b). It can be known from FIGS. 7(a) and 7(b) that: the TEOS has a high DOP and good extinction effect.

EMBODIMENT 5

Figure 8A:
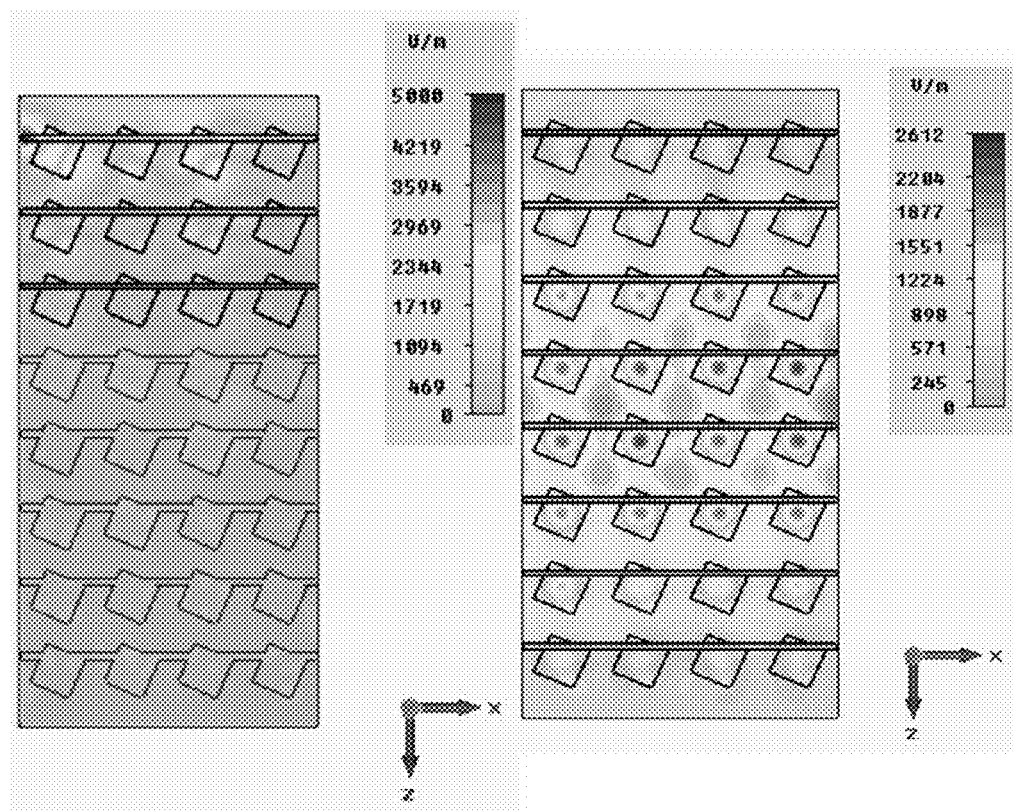
FIG. 8(a) is a TE field distribution diagram of the TEOS for the normalized operating frequency of 0.503 as shown in embodiment 5.
Figure 8B:
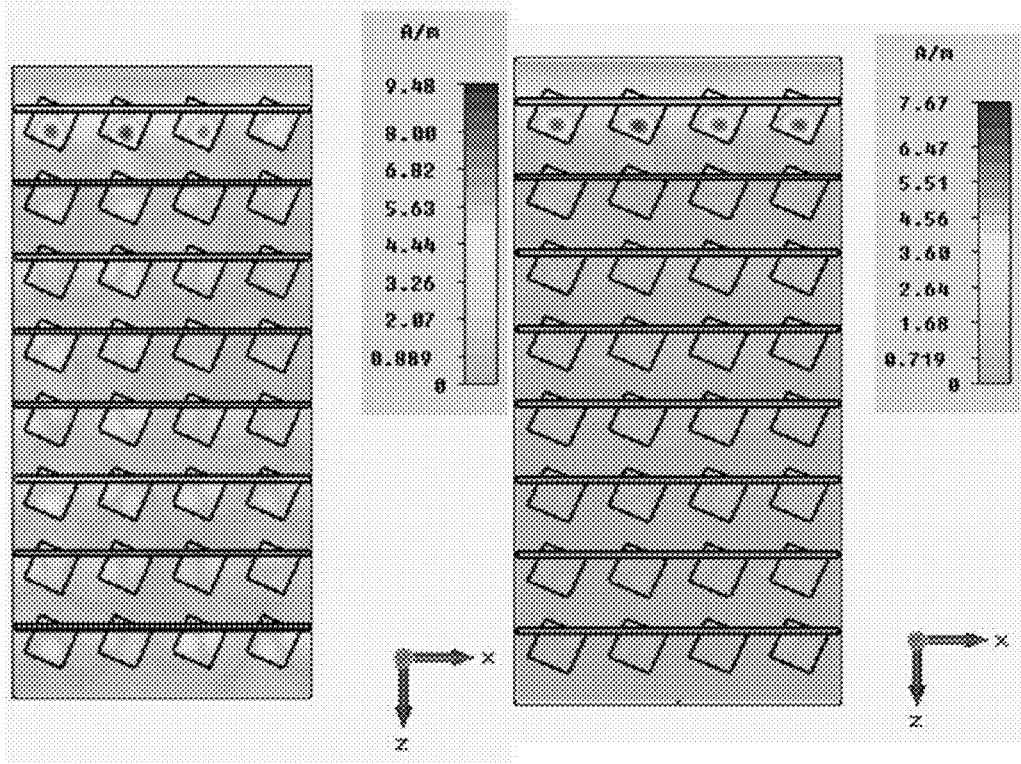
FIG. 8(b) is a TM field distribution diagram of the TEOS for the normalized operating frequency of 0.503 as shown in embodiment 5.

In this embodiment, the normalized photonic operating frequency (a/λ) is 0.503. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 8(a) and 8(b). It can be known from the value simulation results of FIGS. 8(a) and 8(b) that: the TEOS has a high DOP and good extinction effect.

EMBODIMENT 6

Figure 9A:
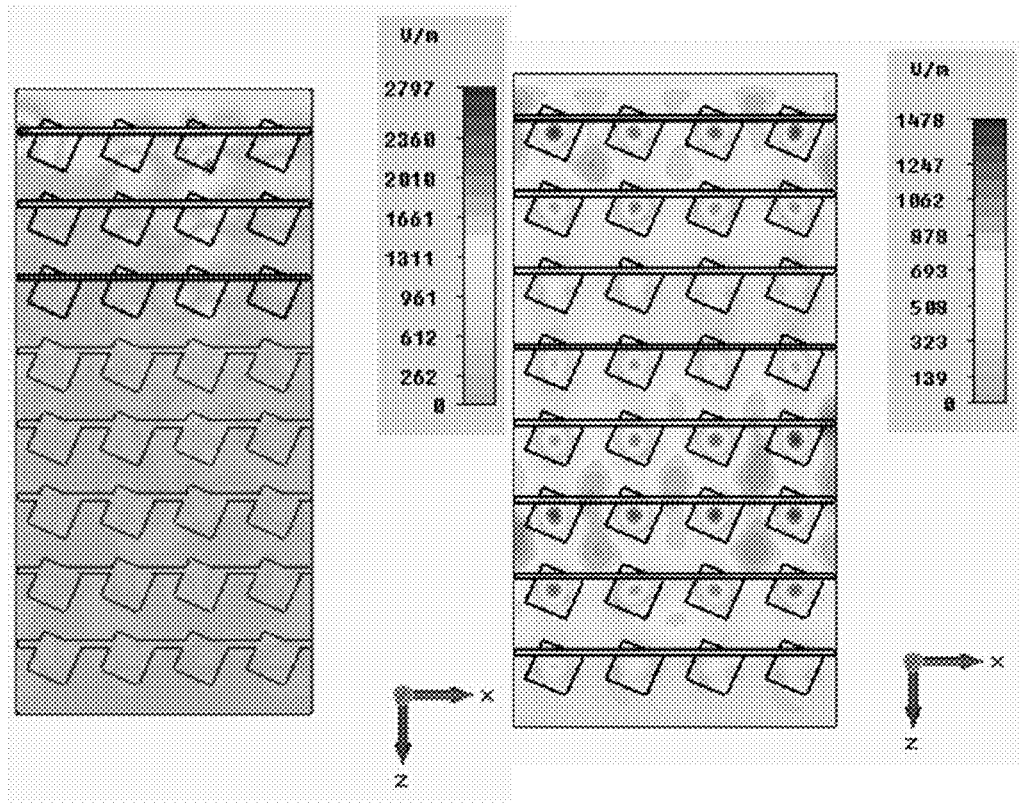
FIG. 9(a) is a TE field distribution diagram of the TEOS for the normalized operating frequency of 0.5071 as shown in embodiment 6.
Figure 9B:
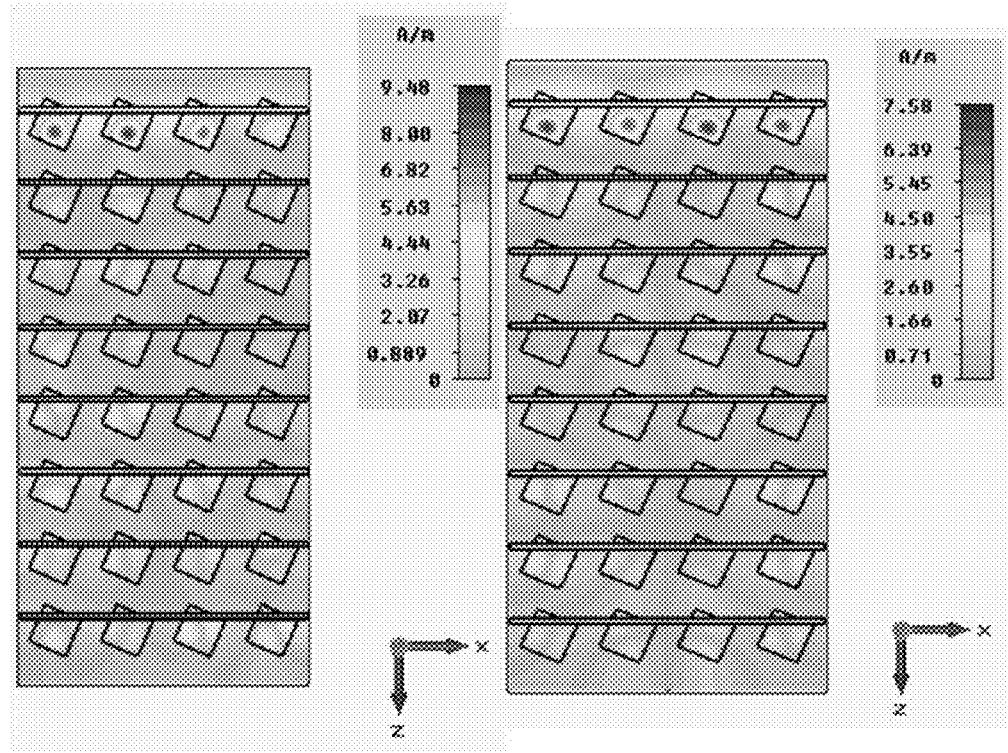
FIG. 9(b) is a TM field distribution diagram in the TEOS for the normalized operating frequency of 0.5071 as shown in embodiment 6.

In this embodiment, the normalized photonic operating frequency (a/λ) is 0.5071. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 9(a) and 9(b). It can be known from FIGS. 9(a) and 9(b) that: the TEOS has a high DOP and good extinction effect.

EMBODIMENT 7

Figure 10A:
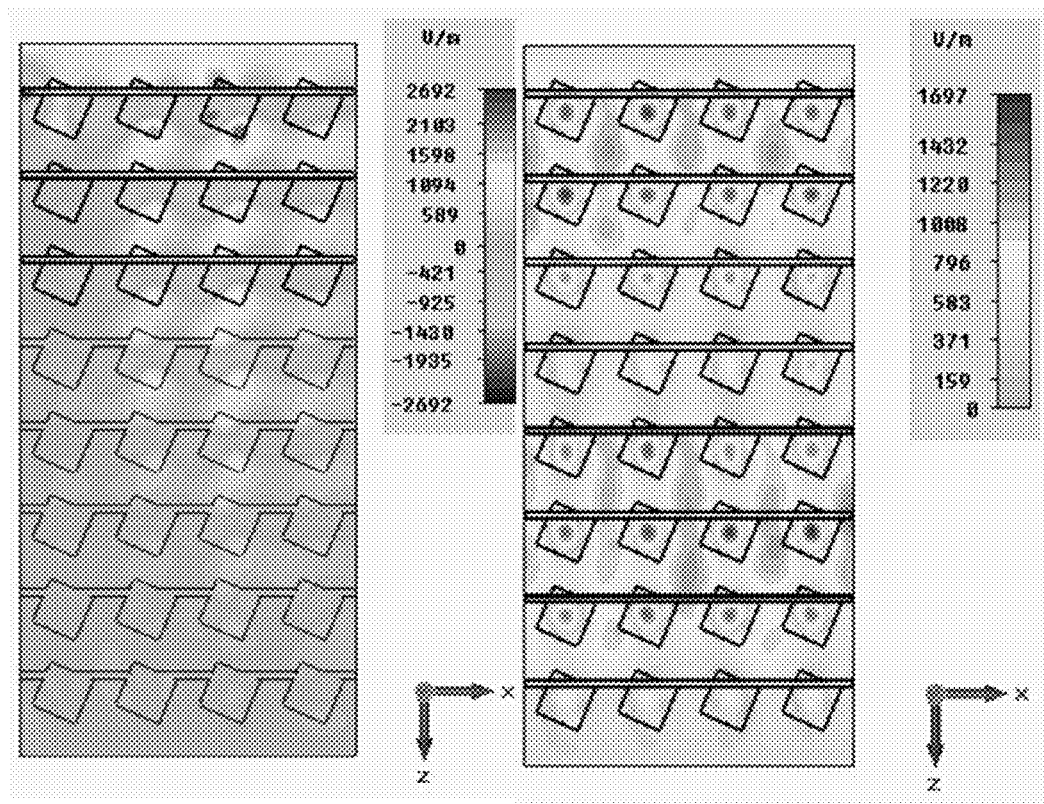
FIG. 10(a) is a TE field distribution diagram of the TEOS for the normalized operating frequency of 0.509 as shown in embodiment 7.
Figure 10B:
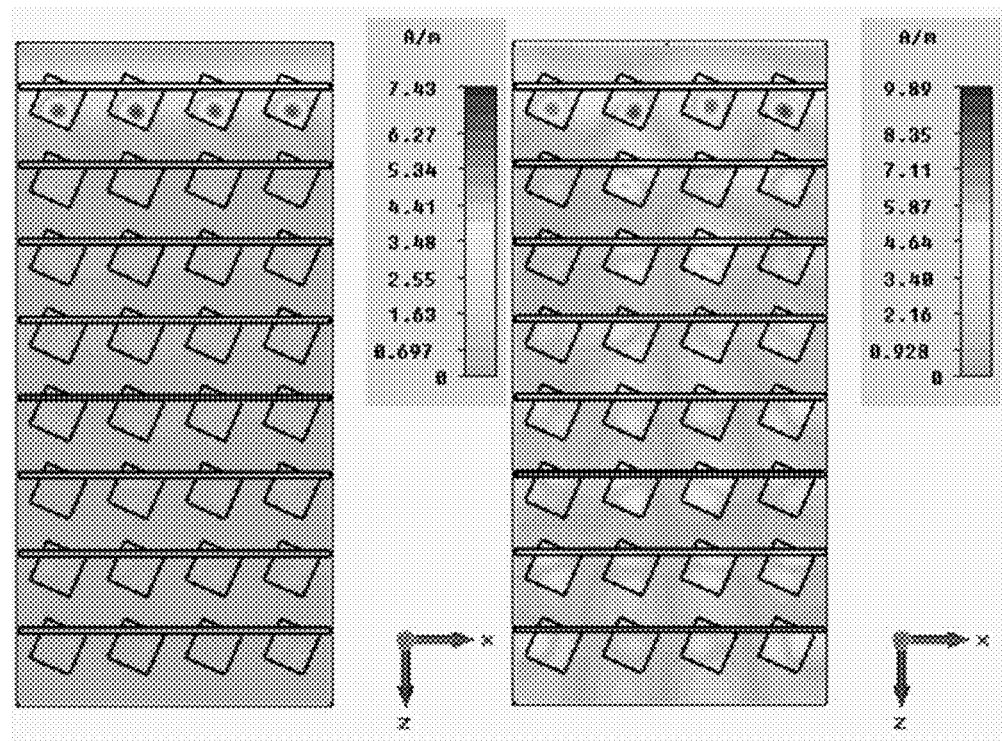
FIG. 10(b) is a TM field distribution diagram in the TEOS for the normalized operating frequency of 0.509 as shown in embodiment 7.

In this embodiment, the normalized photonic operating frequency (a/λ) is 0.509. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 10(a) and 10(b). It can be known from FIGS. 10(a) and 10(b) that: the TEOS has a high DOP and good extinction effect.

EMBODIMENT 8

Figure 11A:
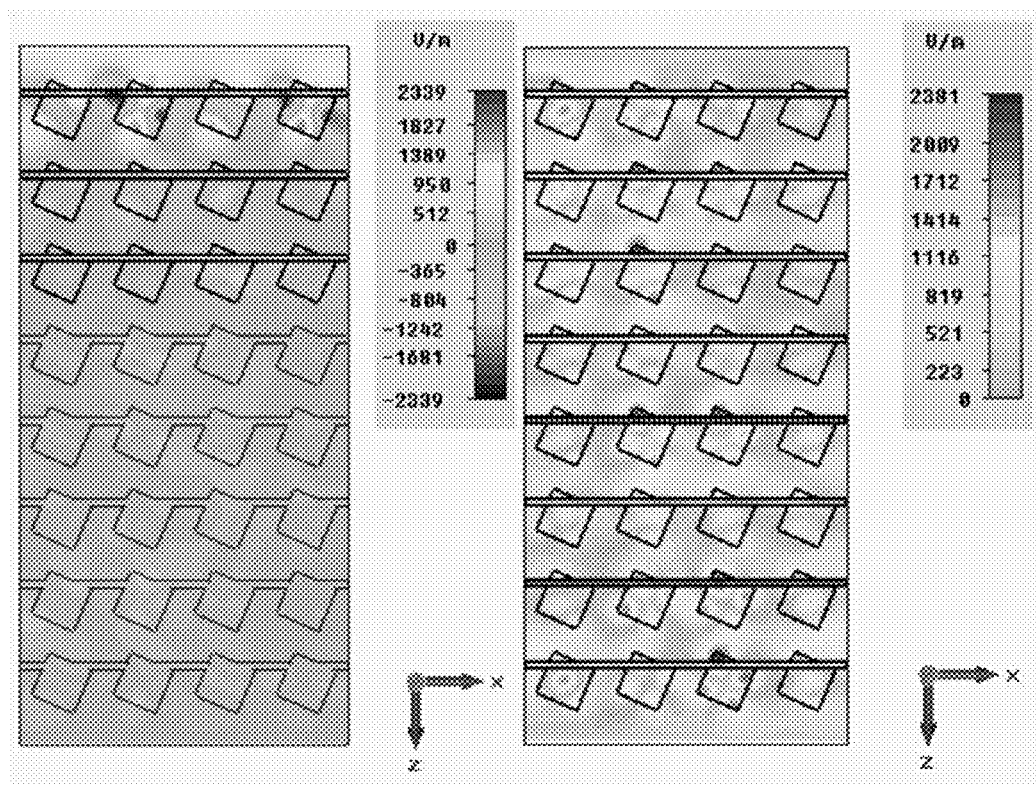
FIG. 11(a) is a TE field distribution diagram of the TEOS for the normalized operating frequency of 0.558 as shown in embodiment 8.
Figure 11B:
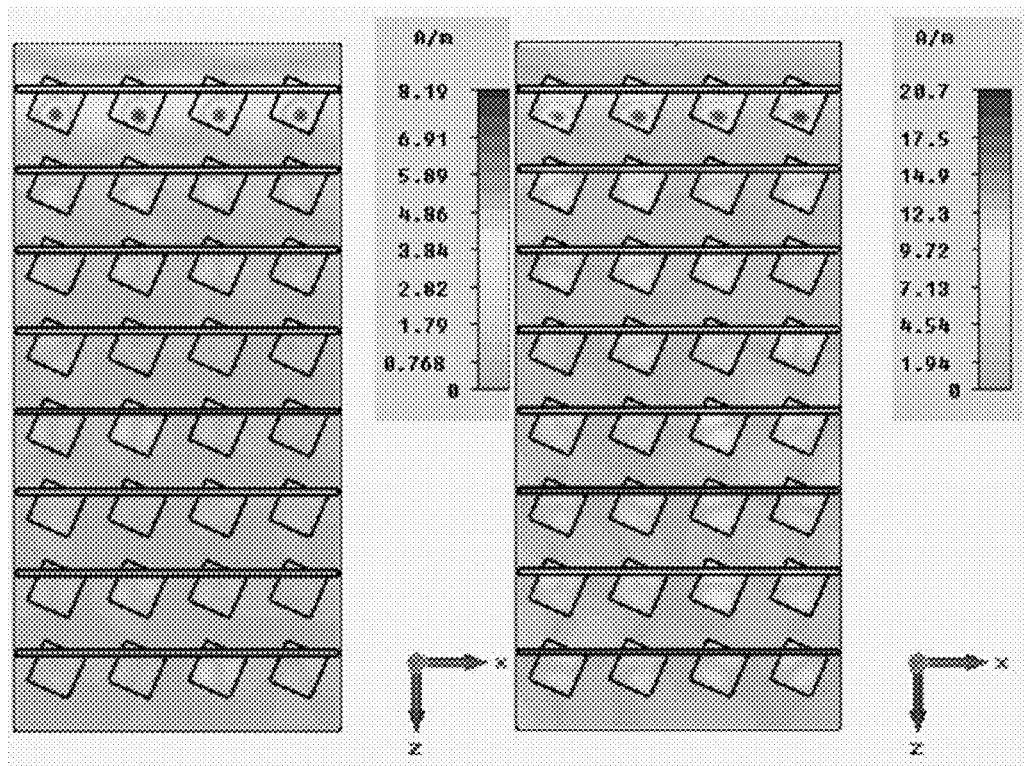
FIG. 11(b) is a TM field distribution diagram in the TEOS for the normalized operating frequency of 0.558 as shown in embodiment 8.

In this embodiment, the normalized photonic operating frequency (a/λ) is 0.558. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 11(a) and 11(b). It can be known from FIGS. 11(a) and 11(b) that: the TEOS has a high DOP and good extinction effect.

EMBODIMENT 9

Figure 12A:
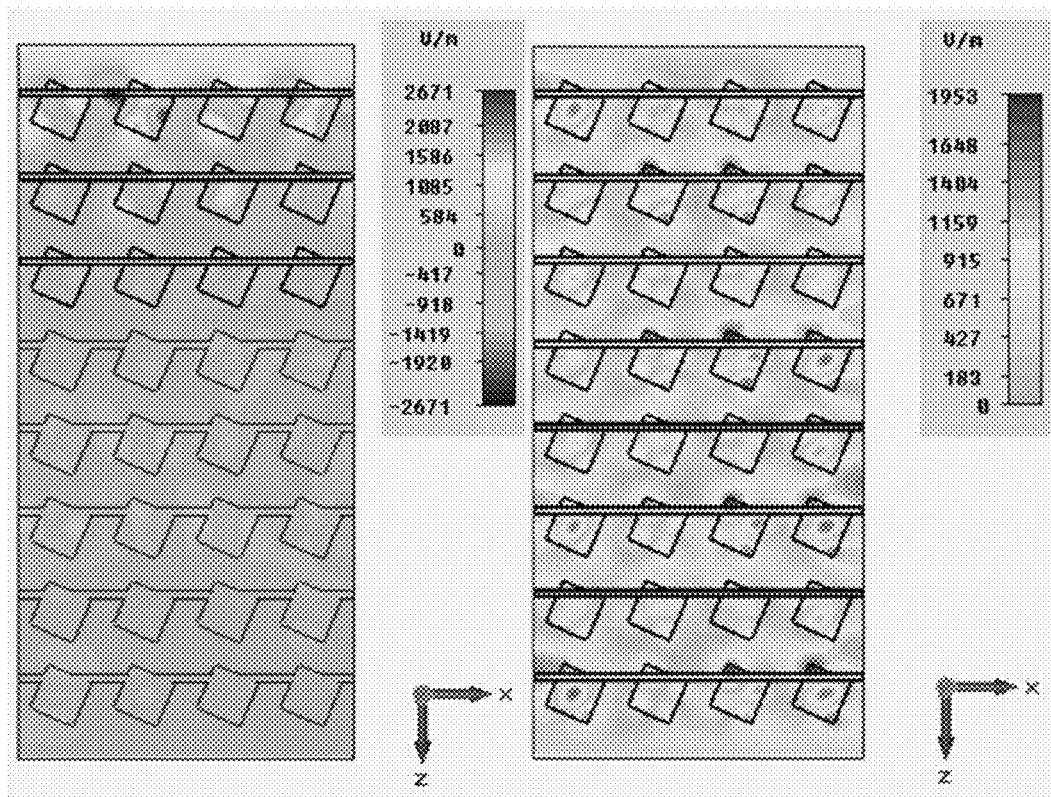
FIG. 12(a) is a TE field distribution diagram of the TEOS for the normalized operating frequency of 0.566 as shown in embodiment 9.
Figure 12B:
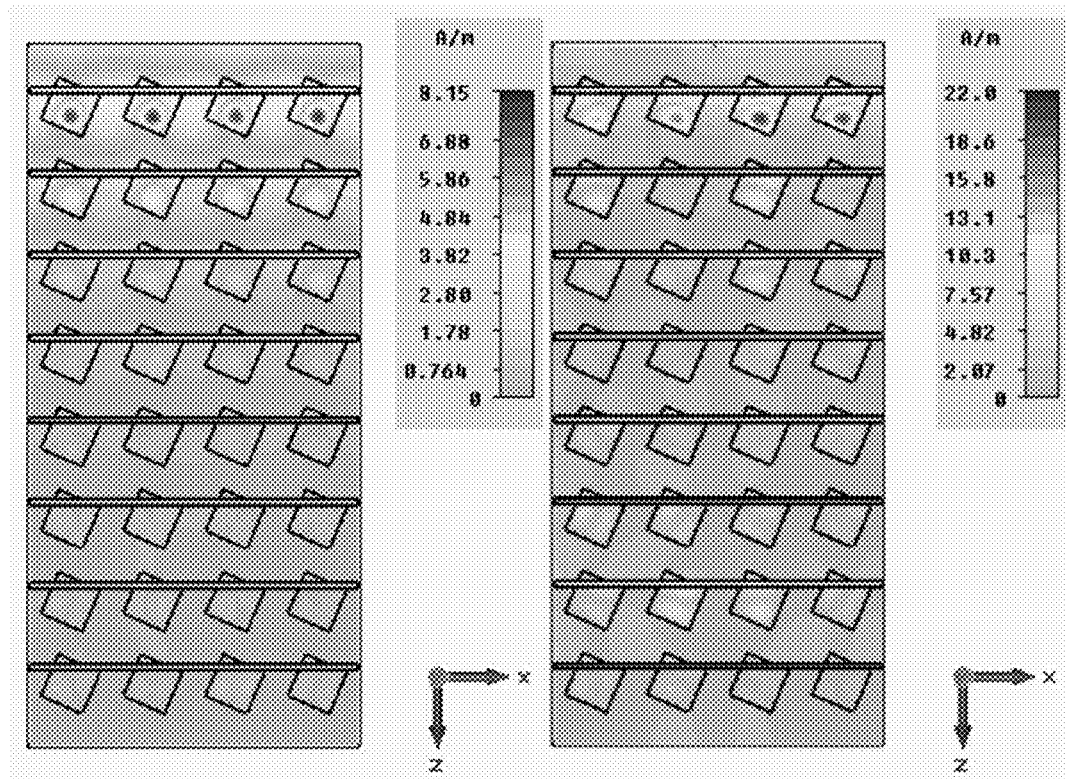
FIG. 12(b) is a TM field distribution diagram in the TEOS for the normalized operating frequency of 0.566 as shown in embodiment 9.

In this embodiment, the normalized photonic operating frequency (a/λ) is 0.566. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 12(a) and 12(b). It can be known from FIGS. 12(a) and 12(b) that: the TEOS has a high DOP and good extinction effect.

EMBODIMENT 10

Figure 13A:
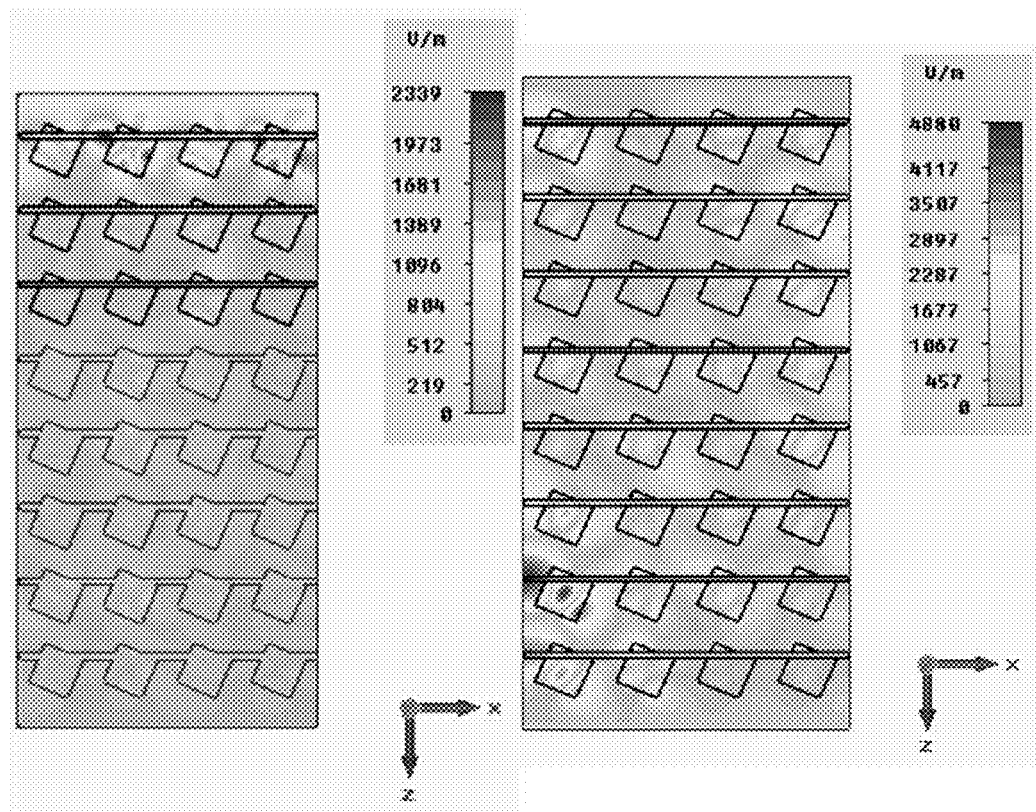
FIG. 13(a) is a TE field distribution diagram of the TEOS for the normalized operating frequency of 0.574 as shown in embodiment 10.
Figure 13B:
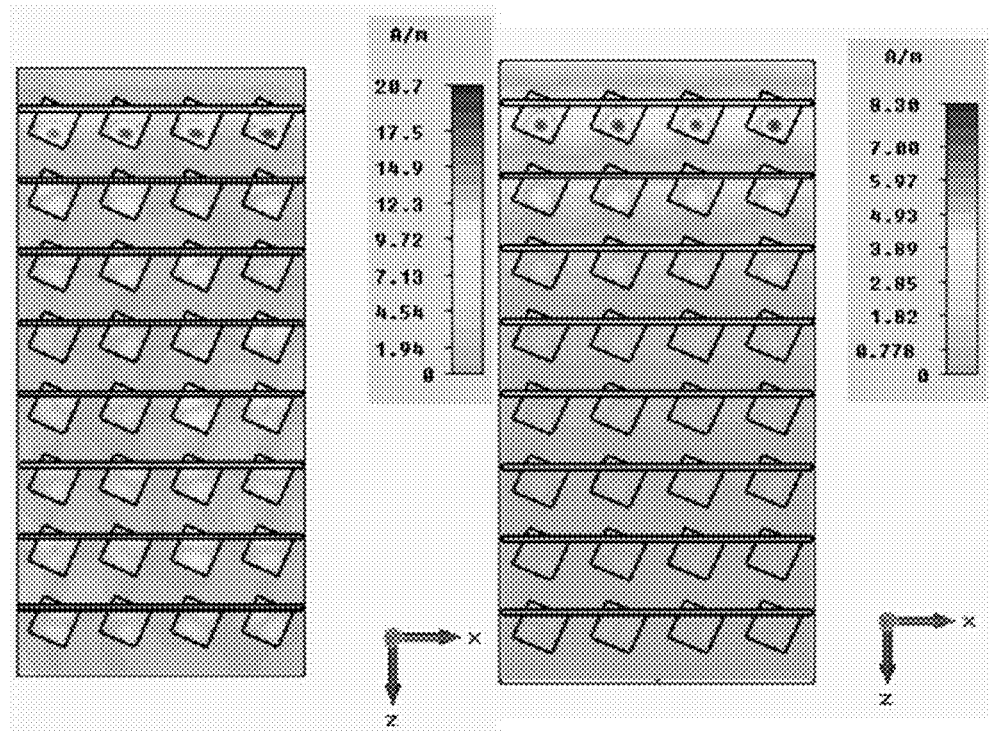
FIG. 13(b) is a TM field distribution diagram in the TEOS for the normalized operating frequency of 0.574 as shown in embodiment 10.

In this embodiment, the normalized photonic operating frequency (a/λ) is 0.574. By adopting the third implementation and verifying with 3D structure parameters for nine layers of high-refractive-index rotating dielectric pillars and nine layers of high-refractive-index dielectric veins consisting of rotating pillars and connecting plates, the result is illustrated in FIGS. 13(a) and 13(b). It can be known from FIGS. 13(a) and 13(b) that: the TEOS has a high DOP and good extinction effect.

While the invention has been described in terms of various specific embodiments, those skilled in the art will recognize that the invention can be practiced with modification within the spirit and scope of the claims.

What is claimed is:

1. A TEOS based on slab PhCs with a high DOP and a large EXR, wherein said TEOS based on slab PhCs with a high DOP and a large EXR comprising:

an upper slab PhC and a lower slab PhC connected as a whole; said upper slab PhC is a first square-lattice slab PhC with a TM bandgap and a complete bandgap, the unit cell of said first square-lattice slab PhC includes a high-refractive-index rotating-square pillar, a single first flat dielectric pillar and a background dielectric, said first flat dielectric pillar is arranged horizontally, said first flat dielectric pillar enables an overall upper slab PhC to form as a whole, and said first flat dielectric pillar includes a high-refractive-index dielectric pipe and a low-refractive-index dielectric, or a high-refractive-index flat film, or a low-refractive-index dielectric; said lower slab PhC is a second square-lattice slab PhC with a TM bandgap and a complete bandgap, the unit cell of said second square-lattice slab PhC includes a high-refractive-index rotating-square pillar, a single second flat dielectric pillar and a background dielectric, said second flat dielectric pillar is arranged horizontally, said second flat dielectric pillar enables an overall lower slab PhC to form as a whole, said second flat dielectric pillar is a high-refractive-index dielectric pillar, said background dielectric is a low-refractive-index dielectric; an normalized operating frequency of said TEOS with a high DOP and a large EXR is 0.453 to 0.458, 0.503 to 0.509 or 0.553 to 0.574, referred to as operating band.

2. The TEOS based on slab PhCs with a high DOP and a large EXR of claim 1, wherein the thickness of the pipe wall in said first flat dielectric pillar in the unit cell of said first square-lattice slab PhC is 0-0.004a, where a is the lattice constant of the PhC; and a width of said low-refractive-index dielectric in the pipe is the difference between a width of said first flat dielectric pillar and the thickness of the pipe.

3. The TEOS based on slab PhCs with a high DOP and a large EXR of claim 1, wherein the side lengths of said high-refractive-index rotating-square pillars of said first and second square-lattice slab PhCs are respectively 0.545a to 0.554a, and their rotating angles are 23.25° to 26.45° and 66.75° to 68.95°; and the widths of said first and second flat dielectric pillars of said first and second square-lattice slab PhCs are respectively 0.075a to 0.082a.

4. The TEOS based on slab PhCs with a high DOP and a large EXR of claim 1, wherein said first and second flat dielectric pillars of said first and second square-lattice slab PhCs are respectively spaced 0.2a from the same side of the centers of the rotating-square pillars.

5. The TEOS based on slab PhCs with a high DOP and a large EXR of claim 1, wherein said high-refractive-index dielectric is silicon, gallium arsenide, titanium dioxide or a different dielectric having a refractive index of more than 2.

6. The TEOS based on slab PhCs with a high DOP and a large EXR of claim 1, wherein said low-refractive-index dielectric is vacuum, air, cryolite, silica, organic foam, olive oil or a dielectric having a different refractive index of less than 1.5.

7. The TEOS based on slab PhCs with a high DOP and a large EXR of claim 1, wherein said TEOS has one state that said first square-lattice slab PhC is located in an OCH and said second square-lattice slab PhC is located outside the OCH, and another state that said second square-lattice slab PhC is located in the OCH and the first square-lattice slab PhC is located outside the OCH.

8. The TEOS based on slab PhCs with a high DOP and a large EXR of claim 1, wherein within the frequency range of 0.453 to 0.458, the state that said second square-lattice slab PhC is located in the OCH and said first square-lattice slab PhC is located outside the OCH is an optically connected state; the state that said first square-lattice slab PhC is located in the OCH and said second square-lattice slab PhC is located outside the OCH is an optically disconnected state; the normalized operating frequency (a/λ) of said TEOS is 0.453 to 0.458, said TE polarization EXR is −22 dB to −23 dB, the highest DOP reaches 100%, a TM wave within an operating band is prevented, and an ISD is −50 dB to −68 dB.

9. The TEOS based on slab PhCs with a high DOP and a large EXR of claim 1, wherein said normalized operating frequency of said TEOS is 0.503 to 0.509 or 0.553 to 0.574, the state that said first square-lattice slab PhC is located in the OCH and said second square-lattice slab PhC is located outside the OCH is the optically connected state; the state that said second square-lattice slab PhC is located in the OCH and said first square-lattice slab PhC is located outside the OCH is the optically disconnected state; the normalized operating frequency of said TEOS is 0.503 to 0.509, said TE polarization EXR is −16 dB to −28 dB, the highest DOP reaches 100%, said TM wave within the operating band is prevented, and the ISD is −16 dB to −53 dB; the normalized operating frequency of said TEOS is 0.553 to 0.574, said TE polarization EXR is −16 dB to −41 dB, said DOP is 100%, the TM wave within the operating band is prevented, and the ISD is −21 dB to −62 dB.

10. The TEOS based on slab PhCs with a high DOP and a large EXR of claim 1, wherein positions of said first square-lattice slab PhC and said second square-lattice slab PhC in the OCH are adjusted by external forces, including mechanical, electric and magnetic forces.

11. The TEOS based on slab PhCs with a high DOP and a large EXR of claim 7, wherein within the frequency range of 0.453 to 0.458, the state that the second slab square-lattice PhC is located in the OCH and said first square-lattice slab PhC is located outside the OCH is the OCH connected state; the state that said first square-lattice slab PhC is located in the OCH and said second square-lattice slab PhC is located outside the OCH is the optically disconnected state; the normalized operating frequency of said TEOS is 0.453 to 0.458, said TE polarization EXR is −22 dB to −23 dB, the highest DOP reaches 100%, the TM wave within the operating band is prevented, and the ISD is −50 dB to −68 dB.

12. The TEOS based on slab PhCs with a high DOP and a large EXR of claim 7, wherein said normalized operating frequency of said TEOS is 0.503 to 0.509 or 0.553 to 0.574, the state that said first square-lattice slab PhC is located in the OCH and said second square-lattice slab PhC is located outside the OCH is the optically connected state; the state that said second square-lattice slab PhC is located in the OCH and said first square-lattice slab PhC is located outside the OCH is an optically disconnected state; the normalized operating frequency of the TEOS is 0.503 to 0.509, said TE polarization EXR is −16 dB to −28 dB, the highest DOP reaches 100%, the TM wave within the operating band is prevented, and the ISD is −16 dB to −53 dB; said normalized operating frequency of said TEOS is 0.553 to 0.574, said TE polarization EXR is −16 dB to −41 dB, the DOP is 100%, the TM wave within the operating band is prevented, and the ISD is −21 dB to −62 dB.

* * * * *